United States Patent [19]

Canclini

[11] Patent Number: 5,631,527

[45] Date of Patent: May 20, 1997

[54] VOICE COIL MOTOR FEEDBACK CONTROL CIRCUIT

[75] Inventor: Athos Canclini, Santa Clara, Calif.

[73] Assignee: SGS-Thomson Microelectronics, Inc., Carrollton, Tex.

[21] Appl. No.: 300,952

[22] Filed: Sep. 6, 1994

[51] Int. Cl.⁶ .................................................. H02K 23/00
[52] U.S. Cl. ............... 318/254; 318/138; 318/439; 318/801; 368/907.2
[58] Field of Search ..................... 318/254, 138, 318/439, 798–815, 280, 290; 388/903, 907.2; 363/98, 132; 361/30; 360/75, 137, 98.05

[56] References Cited

U.S. PATENT DOCUMENTS

| | | | |
|---|---|---|---|
| 5,032,772 | 7/1991 | Gully et al. ........................ | 318/254 X |
| 5,070,420 | 12/1991 | Shinohara et al. ................. | 360/75 |
| 5,111,378 | 5/1992 | Nowak et al. ..................... | 363/98 |
| 5,142,238 | 8/1992 | White ................................ | 318/254 X |
| 5,153,492 | 10/1992 | Landseadel ....................... | 318/254 X |
| 5,287,046 | 2/1994 | Carpenter et al. ................. | 388/903 X |
| 5,343,382 | 8/1994 | Hale et al. ........................ | 363/98 |
| 5,384,524 | 1/1995 | Romano ........................... | 388/907.2 X |
| 5,412,309 | 5/1995 | Ueunten ........................... | 363/98 X |
| 5,412,518 | 5/1995 | Christner et al. .................. | 360/75 X |
| 5,428,522 | 6/1995 | Millner et al. .................... | 318/254 X |
| 5,436,581 | 7/1995 | Oberhauser ....................... | 318/254 X |

Primary Examiner—Karen Masih
Attorney, Agent, or Firm—Theodore E. Galanthay; Lisa K. Jorgenson; Renee M. Larson

[57] ABSTRACT

A circuit for driving a voice coil motor used to position the heads of a disk drive is disclosed. The circuit consists of a an H-bridge circuit, a controller, and a feedback loop. The feedback loop prevents the BEMF from driving a voltage on the voice coil motor above the supply voltage.

10 Claims, 3 Drawing Sheets

VOICE COIL MOTOR FEEDBACK CONTROL CIRCUIT

BACKGROUND OF THE INVENTION

1. Field of the Invention

This invention relates to electronic circuits used to control voice coil motors (VCM's) used in disk drives and more particularly to feedback circuits used to reduce the distortion in the acceleration profile of the voice coil motor actuated heads in a disk drive.

2. Description of the Relevant Art

The problem addressed by this invention is encountered in the head positioning systems in the disk drive industry. Typically, a modern fixed disk drive has two or more double sided disks and over a thousand tracks per disk. Each track is divided into sectors. Each side of a disk requires at least one head to read and write information onto the surface of the disk. The information is usually grouped by surface, track, and sector. Consequently, an important performance characteristic of a disk drive is how quickly the heads of a disk drive can move from one track to another, commonly referred to in the industry as head seek time. The faster the head seek time, the higher the performance of the disk drive since the transfer rate of the information is increased as head seek time is decreased.

It has become common in the disk drive industry to use voice coil motors (VCM's) to move the heads in a disk drive. Voice coil motors offer the advantages of higher speed and higher track to track resolution than stepper motors.

FIG. 1 shows a typical circuit for controlling a voice coil motor 10 as is known in the prior art. The circuit is commonly referred to as an H-configuration because the four n-channel transistors 12, 14, 16, and 18 form an "H" around voice coil motor 10. It is understood in the industry that the transistors in the H-configuration can be any common transistor such as bipolar transistors and the like. In operation, controller 20 controls the position of the heads of a disk drive by controlling the current in the voice coil motor 10. For example, to accelerate the heads in a first direction, the controller would send an enabling signal to transistor 22 turning on transistor 12 and thus applying a high voltage to node 30. At the same time, controller 20 sends a DAC signal to amplifier 34 to turn on transistors 28 and 18 proportional to the strength of the DAC signal, pulling node 32 low. Since node 30 is at a higher voltage potential than node 32, current flows from node 30 to node 32 and the heads of a disk drive will respond to the resulting magnetic field by accelerating proportionally to the current magnitude. Conversely, the heads of a disk drive are accelerated in the opposite direction by enabling transistor 26 and transistor 14, thereby raising node 32 to a higher voltage potential than node 30. The resulting current flow will accelerate the heads in the opposite direction.

To achieve a fast head seek time, the head is conventionally accelerated until it is half way to the desired track, and then decelerated until the head reaches its destination, as shown in FIG. 2. This acceleration-deceleration profile is ideally accomplished by driving current through the voice coil to accelerate the heads and then reversing the current through the voice coil to decelerate the heads. However, during acceleration, heads store energy in the form of kinetic momentum and back electromotive force (BEMF). If the prior art H-bridge circuit is used, the BEMF will drive the voltage on node 30 to a voltage equal to Vcc plus the BEMF which can exceed the safe operating limits of the circuit elements. To protect the circuit elements, the BEMF voltage is typically clamped by diodes, such as diode 13, to a safe operating voltage. When the BEMF voltage is clamped, it distorts the acceleration profile as shown in FIG. 3. This distortion causes excessive wear and drive noise which negatively affects the disk drive.

Therefore, it is an object of the invention to eliminate the distortion in the acceleration profile due to the clamping of the BEMF voltage.

It is further an object of this invention to eliminate the diodes used to clamp the BEMF voltage.

These and other objects, features, and advantages will be apparent to those skilled in the art from the following detailed description when read in conjunction with the accompanying drawings and appended claims.

SUMMARY OF THE INVENTION

The invention can be summarized as a circuit for driving a voice coil motor used to position the heads of a disk drive. The circuit consists of a an H-bridge circuit, a controller, and a feedback loop. The feedback loop prevents the BEMF of the VCM from driving a voltage on the voice coil motor above the supply voltage.

DETAILED DESCRIPTION OF THE PREFERRED EMBODIMENT

Figure 1:
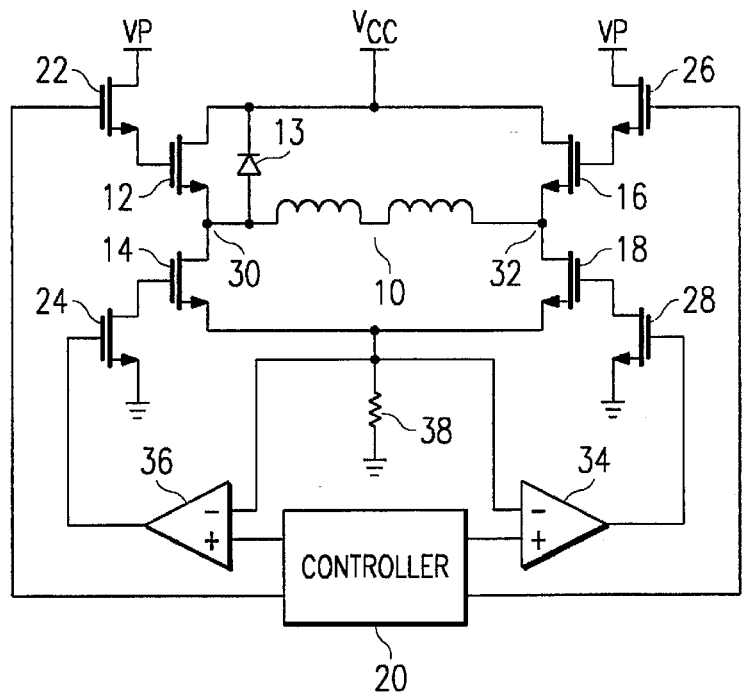
FIG. 1 is an electrical schematic of a circuit used to drive a voice coil motor as is known in the prior art.
Figure 2:
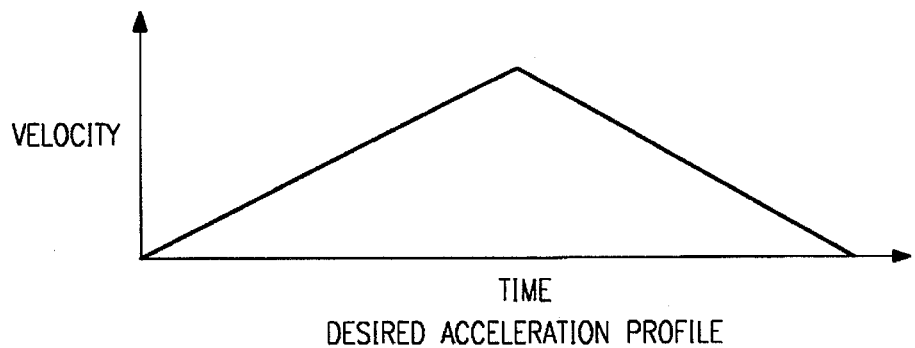
FIG. 2 is the desired acceleration curve profile.
Figure 3:
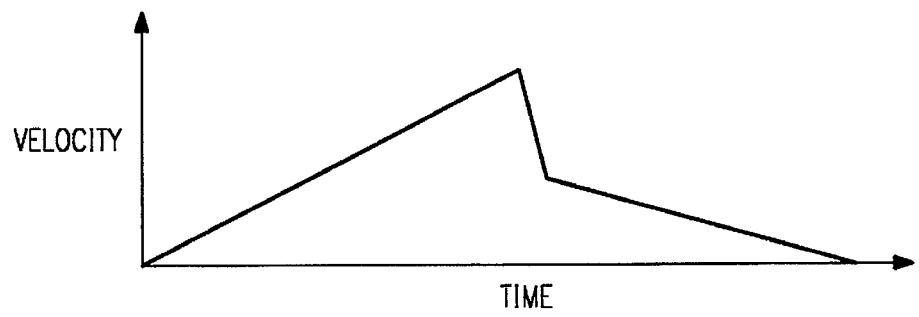
FIG. 3 is the actual acceleration profile for a H-bridge circuit which clamps the BEMF according to the prior art.
Figure 4:
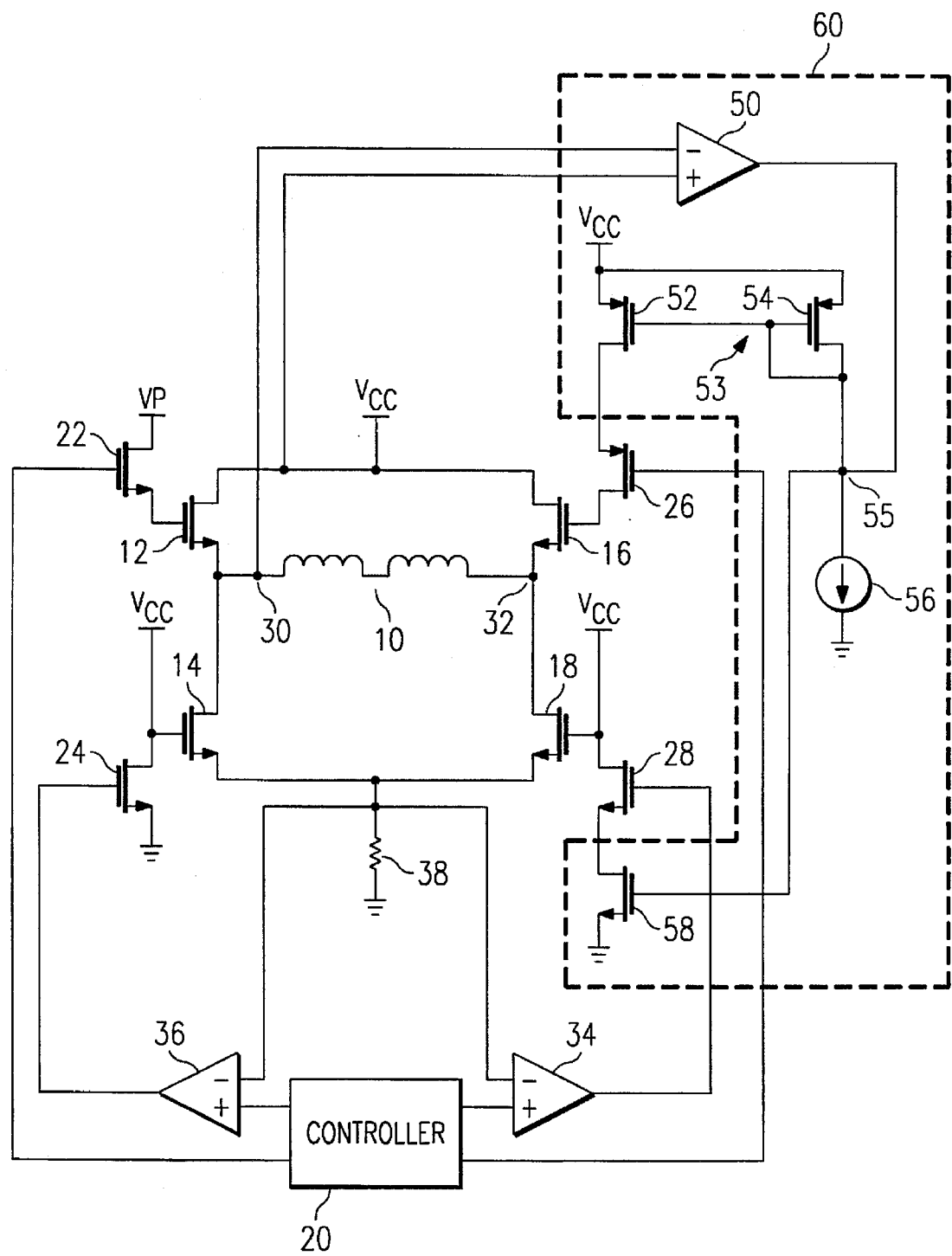
FIG. 4 is an electrical schematic according to the preferred embodiment of the circuit used to drive a voice coil motor.

A circuit for driving a voice coil motor to position the heads in a disk drive according to an embodiment of the invention will be described. Referring now to FIG. 4, a voice coil motor 10 has a node 30 and a node 32 for receiving current. Node 30 is connected to the source of n-channel transistor 12, to the drain of n-channel transistor 14, and to the non-inverting input of operational transconductance amplifier (OTA) 50. Transistor 12 has a drain connected to a voltage supply Vcc and gate connected to the source of n-channel transistor 22. The drain of transistor 22 is connected to a pumped voltage Vp and the gate of transistor 22 is connected to a controller 20. The gate of transistor 14 is connected to the drain of n-channel transistor 24 and to a Vcc voltage. The gate of transistor 24 is connected to the output of an OTA 36 and the source of transistor 24 is connected to a voltage reference (ground). The source of transistor 14 is connected to a sense resistor 38, to the inverting inputs of OTA 36 and 34, and to the source of n-channel transistor 18. The non-inverting input of OTA 36 is connected to the controller 20. Transistors 12, 14, 16 and 18 form an H-bridge wherein transistors 12, 14, 16, and 18 are the first, second, third and fourth transistors of the H-bridge, respectively.

Similarly, the non-inverting input to OTA 34 is connected to controller 20. The drain of n-channel transistor 16 is connected to Vcc and the source is connected node 32. The drain to n-channel transistor 18 is connected to node 32 and its source is connected to resistor 38. The other end of resistor 38 is connected to ground.

Feedback loop 60 senses the voltage on node 30 and controls the conductivity of transistors 16 and 18 responsive to the voltage on node 30 exceeding Vcc.

In feedback loop 60, the inverting input of OTA 50 is connected to Vcc and its output is connected to node 55. The drain of p-channel transistor 52 is connected to Vcc and the drain of p-channel transistor 54. The gate of transistor 52 is connected to the gate and source of transistor 54 and to node 55. The source of transistor 52 is connected to drain of p-channel transistor 26 whose source is connected to the gate of transistor 16. The gate of transistor 26 is connected to controller 20. A current source 56 has a drain connected to node 55 and a source connected to ground. The gate of n-channel transistor 58 is connected to node 55 and has a current path from the source of transistor 28 to ground. Transistor 28 has a drain connected to the gate of transistor 18 and means for pulling the gate up to Vcc. The gate of transistor 28 is connected to the output of OTA 34.

In operation, the current through voice coil motor 10 is controlled by the controller 20 controlling H-bridge transistors 12, 14, 16, and 18. A typical control sequence for moving the heads of a disk drive is for the controller to send an enabling signal to transistor 22 turning on transistor 12 and thus applying a high voltage to node 30. At the same time, controller 20 sends a DAC signal to amplifier 34 to turn on transistors 28 and 18 proportional to the strength of the DAC signal, pulling node 32 low. This raises the voltage at node 30 to just below Vcc while lowering the voltage at node 32 to just above ground as shown at $T_0$ in FIG. 5. Consequently, current flows from node 30 to node 32 thereby causing the heads to accelerate and gain velocity.

Figure 5:
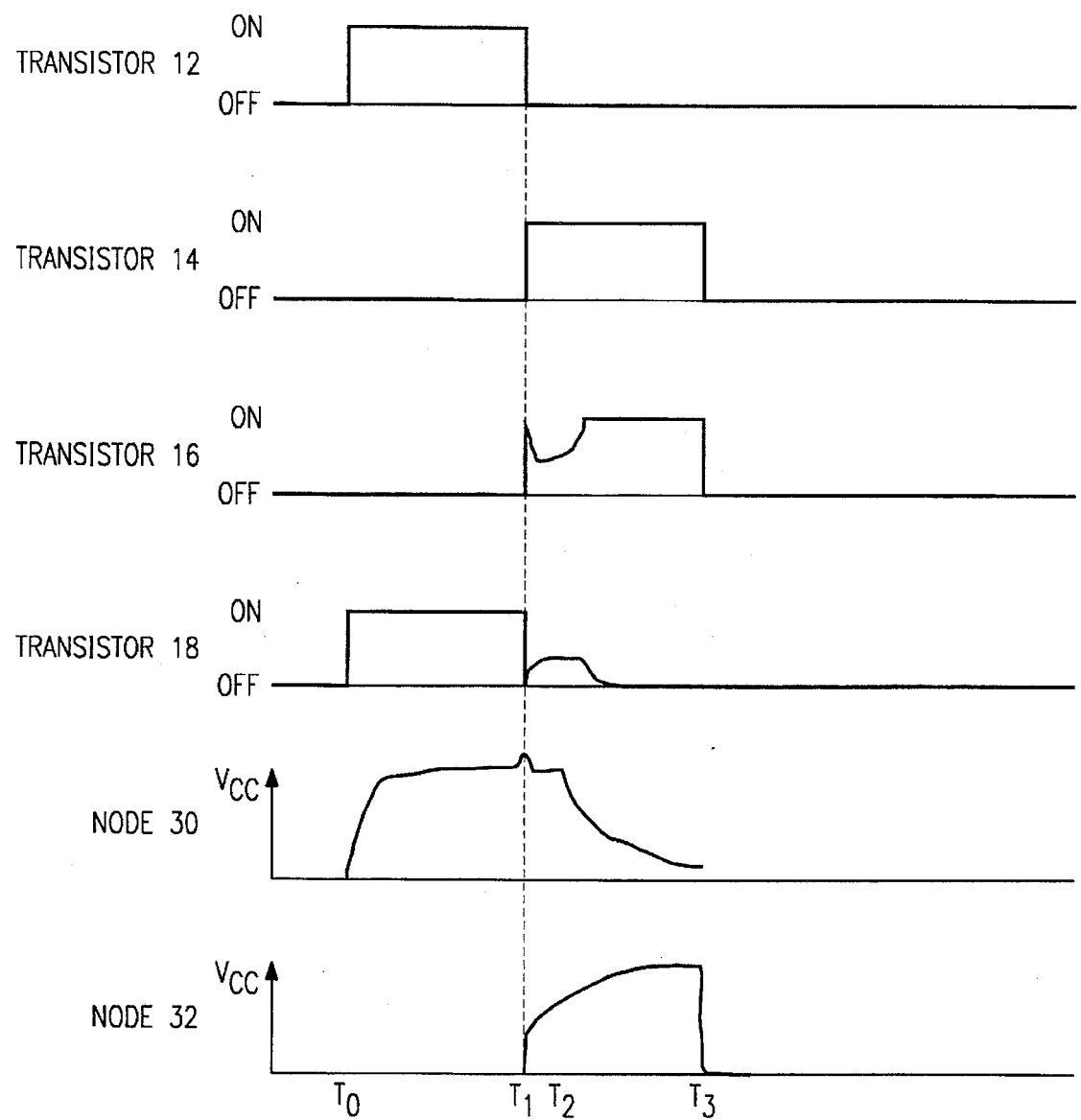
FIG. 5 is a timing diagram of the preferred embodiment.

To stop the heads at a desired location, transistors 12 and 18 are turned off by controller 20 while transistors 16 and 14 are turned on by controller 20 as shown at $T_1$ in FIG. 5. At this point in the sequence, energy is stored in the VCM in the form of momentum and BEMF. Since node 32 is being driven to Vcc and the VCM has a stored BEMF voltage, the voltage at node 30 is driven to a voltage just above Vcc as shown by the voltage spike on node 30 in FIG. 5. The BEMF above Vcc is sensed by the feedback loop 60 which actively lowers the voltage of node 32 until the BEMF is no longer above Vcc by controlling the conductivity of transistor 16 and transistor 18. After the BEMF voltage is absorbed by transistor 14, the voltage at node 30 is quickly driven to just above ground while the voltage on node 32 is driven to just below Vcc which reverses the current flow in the VCM thereby decelerating the heads, eventually stopping the heads at the desired location as is known in the industry.

The feedback loop 60 is comprised of OTA 50, a current mirror 53 made from transistors 52 and 54, a current source 56, and transistor 58. The feedback loop operates by sensing the voltage on node 30 and feeding current into node 55 proportional to the BEMF voltage. The higher the BEMF voltage, the more current that is injected into node 55. As current is injected into node 55 the current through the current mirror 53 is reduced which effectively reduces the gate voltage of transistor 16 thereby allowing transistor 16 to operate linearly allowing node 32 to drop in voltage, as shown in FIG. 5. Additionally, the current from OTA 50 is injected into the gate of transistor 58 which effectively allows for transistor 18 to operate linearly pulling node 32 towards ground to a voltage equal to the supply voltage minus the sensed BEMF voltage above the supply voltage, as qualitatively shown in FIG. 5. Consequently, transistor 16 and 18 are operating in unison to drive node 32 to the lower voltage necessary to keep node 30 from rising above Vcc. The BEMF voltage can then be dissipated through transistor 14. As discussed above, the feedback loop 60 relinquishes control after the BEMF is dissipated.

Using the feedback circuit offers the advantages of eliminating the diodes used to clamp the BEMF voltage and the distortion in the acceleration profile due to the clamping of the BEMF voltage.

Although this invention has been described as having one feedback loop, it is understood that a second loop is necessary to handle the BEMF voltage caused from accelerating the heads in the opposite direction. The second feedback loop would sense node 32 and control transistors 12 and 14 in an analogous manner as described above. Even though the invention has been described and illustrated with a certain degree of particularity, it is also understood that there a numerous methods for implementing the feedback loop and/or the VCM control circuit without departing from the spirit of the invention, as hereinafter claimed.

We claim:

1. A circuit for driving a voice coil motor comprising:

a voice coil motor having first node and having a second node;

an H-bridge circuit comprising;

a first transistor having a current path between a supply voltage and the first node of said voice coil motor, and having a control element;

a second transistor having a current path between the first node of said voice coil motor and a voltage reference, and having a control element;

a third transistor having a current path between the supply voltage and the second node of said voice coil motor, and having a control element; and a fourth transistor having a current path between the second node of said voice coil motor and the voltage reference, and having a control element;

a means for controlling said first, second, third and fourth transistors having a first output connected to the control element of said first transistor, having a second output connected to the control element of said second transistor, having a third output connected to the control element of said third transistor, and having a fourth output connected to the control element of said fourth transistor; and a feedback loop having an input coupled to the first node of said voice coil motor and having an output coupled to the control elements of said third transistor and said fourth transistor for changing the conductivity of said third and fourth transistors responsive to the voltage on the first node of said voice coil.

2. The circuit of claim 1 wherein said feedback loop comprises an amplifier having an inverting input connected to said voltage supply and having a non-inverting input connected to the first node of said voice coil motor, and having an output for changing the conductivity to said third and fourth transistors responsive to the voltage on the first node of said voice coil motor.

3. The circuit of claim 2 wherein said amplifier comprises an operational transconductance amplifier.

4. The circuit of claim 2 wherein the feedback loop further comprises a first current mirror connected in series with said amplifier and the control element of said third transistor.

5. The circuit of claim 2 wherein the feedback loop further comprises a transistor connected in series with the control element of said fourth transistor and ground.

6. The circuit of claim 1 wherein said first, second, third, and fourth transistors are MOSFET transistors.

7. The circuit of claim 1 wherein said H-bridge circuit, said control circuit, and feedback loop are on a single integrated circuit.

8. A circuit for driving a voice coil motor comprising:

a voice coil motor having first node and having a second node;

an H-bridge circuit comprising;

- a first transistor having a current path between a supply voltage and the first node of said voice coil motor, and having a control element;
- a second transistor having a current path between the first node of said voice coil motor and a voltage reference, and having a control element;
- a third transistor having a current path between a supply voltage and the second node of said voice coil motor, and having a control element; and
- a fourth transistor having a current path between the second node of said voice coil motor and a voltage reference, and having a control element;
- a controller for controlling the conductivity of said first, second, third, and fourth transistors
- means for feeding back the voltage on the first node of said voice coil to said third transistor and to said fourth transistor.

9. The circuit of claim 8 wherein said means for feeding back the voltage on the first node comprises an amplifier having an inverting input connected to said voltage supply and having a noninverting input connected to the first node of said voice coil motor, and having an output for changing the conductivity to said third and fourth transistors responsive to the voltage on the first node of said voice coil motor.

10. The circuit of claim 9 wherein said amplifier comprises an operational transconductance amplifier.

* * * * *